United States Patent [19]

Briles

[11] 4,086,839
[45] May 2, 1978

[54] DOME HEADED RIVET, AND WORKPIECE ASSEMBLY

[76] Inventor: Franklin S. Briles, 1301 Dolphin, Corona Del Mar, Calif. 92625

[21] Appl. No.: 783,976

[22] Filed: Apr. 4, 1977

Related U.S. Application Data

[63] Continuation-in-part of Ser. No. 732,869, Oct. 15, 1976, Pat. No. 4,051,592, which is a continuation-in-part of Ser. No. 645,242, Dec. 29, 1975, Pat. No. 4,000,680, which is a continuation-in-part of Ser. No. 621,826, Oct. 14, 1975, abandoned.

[51] Int. Cl.² .............................................. F16B 19/04
[52] U.S. Cl. ............................................ 85/37; 29/509; 29/522 A
[58] Field of Search ................... 85/37, 9 R; 29/509, 29/522, 526; 403/408

[56] References Cited

U.S. PATENT DOCUMENTS

| | | | |
|---|---|---|---|
| 2,237,338 | 4/1941 | Dale | 85/37 |
| 2,482,391 | 9/1949 | Webster | 85/37 |
| 3,526,032 | 9/1970 | Pipher | 85/37 X |
| 3,747,467 | 7/1973 | Rosman | 85/37 |
| 4,000,680 | 1/1977 | Briles | 85/37 |
| 4,004,484 | 1/1977 | Speakman | 85/37 |

FOREIGN PATENT DOCUMENTS 707,103   6/1941   Germany .................................. 85/37

*Primary Examiner*—Ramon S. Britts
*Attorney, Agent, or Firm*—William W. Haefliger

[57] ABSTRACT

A rivet with a forward shank and a tapered head has a dome protruding axially in a rearward direction. The dome is ring shaped, extends about the rivet axis, and is in substantial axial alignment with the shank outer surface. Flattening of the dome substantially eliminates clearances between the head and a head receiving tapered counterbore, in work.

9 Claims, 10 Drawing Figures

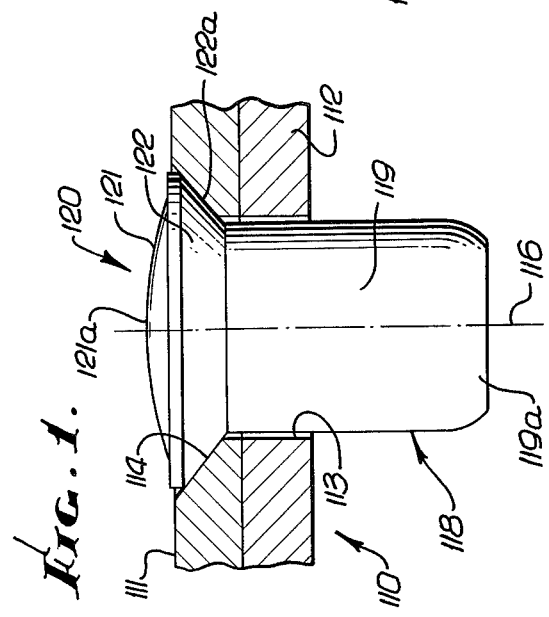
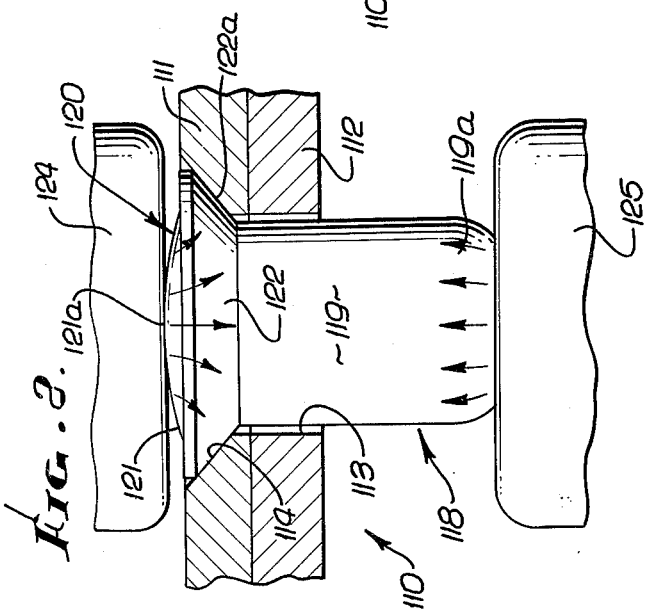
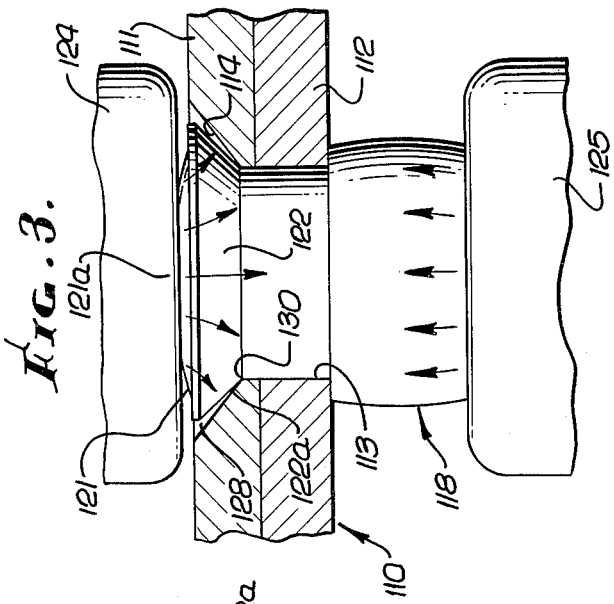
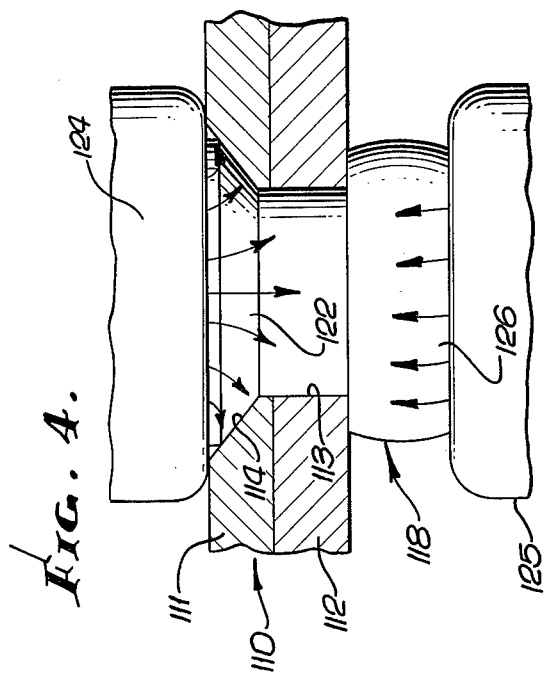
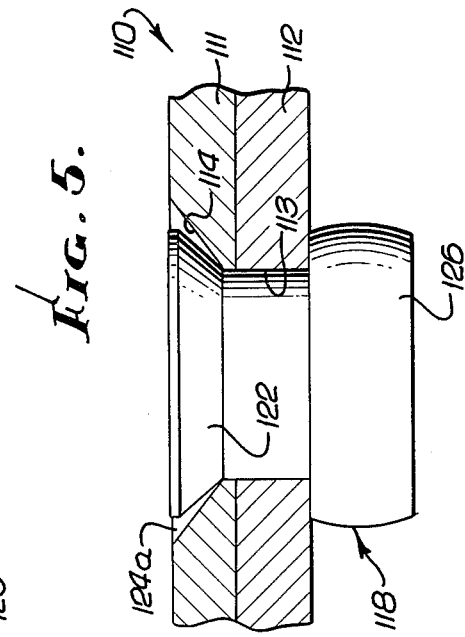

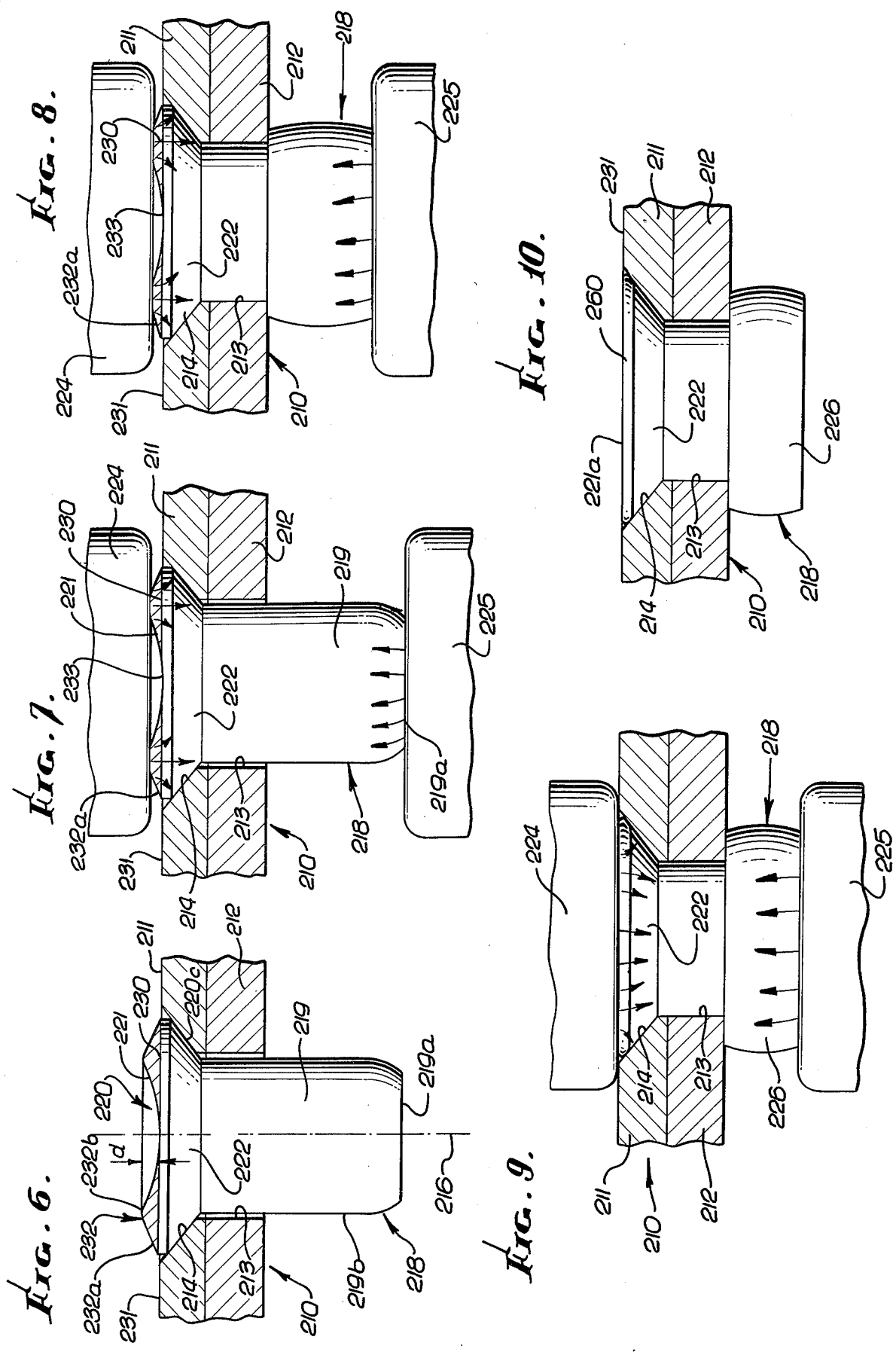

DOME HEADED RIVET, AND WORKPIECE ASSEMBLY

BACKGROUND OF THE INVENTION

This application is a continuation-in-part of my co-pending application Ser. No. 732,869, filed Oct. 15, 1976, now U.S. Pat. No. 4,051,592, which was a continuation-in-part of Ser. No. 645,242, filed Dec. 29, 1975, now U.S. Pat. No. 4,000,680, which was a continuation-in-part of Ser. No. 621,826, filed Oct. 14, 1975, now abandoned.

This invention relates generally to fasteners, and more particularly concerns improvements in rivet type fasteners having certain unusual advantages in construction, mode of installation and operation.

Experience with conventional rivet retention of aircraft skins to fuselage structures has indicated several disadvantages and problems, particularly where fully tapered rivet heads are employed to seat in tapered counterbores or countersinks. Due to requirements, especially in aircraft assembly, that the head not protrude from the work surface at the completion of riveting; it has been the practice to drill deep countersinks ensuring full reception of the head in the countersink; however, this frequently results in damage to the work or skin surrounding the countersink, caused by impact of the tool that strikes the rivet head during rivet upset formation. In an effort to alleviate this problem, rivet heads have been formed to incorporate rearwardly facing central domes, an example being that in U.S. Pat. No. 3,927,458. However, the flattening of such domes or crowns during riveting can result in the formation of unwanted clearances between the rivet heads and work countersinks, as for example can occur due to creation of unwanted metal spring-back conditions. This detrimental condition is also due to the tendency for head metal when the central dome to extrude into bore clearances. Further, fluids can and to enter the gap or clearance to cause corrosion of the connection over a period of time, creating a dangerous weakening of the connection. In addition, it is difficult to paint over the gap or clearance, without resulting in paint cracking. Finally, it is found in practice that it is very difficult to make the peripheries of such rivets exactly round, which aggravates the above problems.

The rivet in U.S. Pat. No. 2,237,338 to Dale is thickened at the extreme outer edge of the head; however, seating and separation problems are encountered, as described in that patent.

SUMMARY OF THE INVENTION

It is a major object of the invention to provide solutions to the above as well as other problems, through the provision of a simple rivet and riveted connection incorporating a number of unusual advantages. Basically, these stem from the concept that the rivet head is made with a rearward facing, ring shaped dome which extends concentrically about the rivet shank axis and in general alignment with the shank surface. As will appear, the radially outer portion of the dome then is in axial alignment with the tapered bore or countersink in the work, no spring-back problem is created, and flattening of the dome during upset formation acts primarily to deform that portion of the head adjacent the countersink directly toward the latter, to eliminate any clearances therebetween. Otherwise stated, ring dome flattening acts to eliminate clearances, instead of creating them as in the cases of center dome flattening or thickened outer edge flattening. Also, the outer flare angle of the ring dome cooperates with the frusto-conical angle of the head, during rivet manufacture, to result in a round periphery.

Basically, then, the new rivet itself is defined as having an axially extending shank receivable in the workbore, the rivet including a head having a forwardly tapered frusto-conical surface and an end face defining a ring-shaped dome extending about the shank axis and in generally axial alignment with said frusto-conical surface.

The method of securing the rivet to the workpiece includes the following steps:

(a) seating the rivet head frusto-conical surface against the work tapered counterbore and so that the head end face periphery is substantially flush with the work, and so that the radially outermost portion of the ring shaped dome is in axial alignment with the work tapered counterbore, (b) deforming the rivet heat and end terminal to tightly engage the work counterbore and to form an upset at the end of the rivet opposite the head, (c) such deformation of the head being carried out to flatten the ring shaped dome and thereby substantially eliminate any axial clearances between the head and the tapered counterbore.

As will appear, the dome radially outer extent may extend in axially spaced relation to the work counterbore, i.e. countersink; and the dome crest may extend in substantially axial alignment with the rivet shank outer surface. As a result, the head forward taper remains in tight engagement with the counterink during riveting, and no clearances can develop therebetween.

These and other objects and advantages of the invention, as well as the details of an illustrative embodiment, will be more fully understood from the following specification relation to the drawings, in which:

DRAWING DESCRIPTION

FIG. 1 is an elevation, taken in section, showing a conventional rivet inserted into a workpiece;

FIG. 2 is a view like FIG. 1 at the beginning of rivet deformation;

FIG. 3 is a view like FIG. 2 showing an intermediate deformation condition with head partial extrusion through openings;

FIG. 4 is a view like FIG. 3 showing the rivet at the completion of deformation, with the hammer and anvil in forcible compressive engagement with the rivet head and upset;

FIG. 5 is a view of the completely formed FIG. 4 rivet, after removal of the hammer and anvil and illustrating spring-back;

FIG. 6 is an elevation, taken in section, showing the rivet of the present invention inserted into a workpiece;

FIG. 7 is a view like FIG. 6 at the beginning of rivet deformation;

FIG. 8 is a view like FIG. 7, showing an intermediate deformation condition;

FIG. 9 is a view like FIG. 8 showing the rivet at the completion of deformation, with the hammer and anvil in forcible compressive engagement with the rivet head and upset; and FIG. 10 is a view of the completely formed rivet, after removal of the hammer and anvil.

DETAILED DESCRIPTION

In the drawings, the workpiece 110 includes, for example, two metallic panels 111 and 112. They contain a main bore 113 extending in both panels, and a tapered counterbore or countersink 114 in panel 111. The bore and countersink have a common forwardly extending axis 116.

FIG. 1 shows a conventional metallic rivet 118 having an axially extending cylindrical shank 119 received or inserted forwardly in and through bore 113, with clearance as indicated, the rivet tail 119a projecting forwardly of panel 112.

The rivet also includes a head 120 having a rearwardly facing end face 121 centrally domed at 121a. The head also includes a frusto-conical, forwardly tapered section 122 located forwardly of end face 121, section 122 seating against the countersink 114 in FIGS. 1 and 2. In FIGS. 2-4 the rivet is progressively deformed as by hammer 124 and 125, to flatten the head dome 121a and to form the upset 126 seen in FIGS. 4 and 5. The arrows at the head 120 in FIGS. 2-4 show the directions of metal deformation during flattening of the dome. In this regard, FIG. 3 shows the development of annular clearance 128 between the countersink 114 and the tapered surface of head section 122, due to the tendency for head metal to flow forwardly toward the clearance between the shank and bore 113. In this regard, head metal adjacent tapered surface 122a tends to flow toward and around annular corner 130 at the intersection of bore 113 with countersink 114 due to the fact that force imparted to the rivet head by the hammer is centrally directed, i.e. at dome 121a, as is clear from FIGS. 2-4. Corner 130 defines an extrusion angle for rivet metal flow.

As the riveting process is completed as seen in FIG. 4, the head metal adjacent countersink 114 is urged toward the latter to temporarily eliminate the clearance 128; however, due to the effects of metal spring-back, after the hammer 124 is removed, the head metal tends to withdraw or retract slightly from the countersink surface, again developing slight clearance 124a as best seen in FIG. 5. This condition which can and does occur frequently, is undesired and harmful, since corrosive fluids can then enter the gap or clearance 124a, to corrode and weaken the connection. There is no way to prevent such spring-back, without overloading. A simple example of spring-back is the downward central deflection of a beam freely supported by two laterally spaced ledges, under a central load, followed by upward deflection when the load is removed.

FIGS. 6-10 illustrate a very simple and effective solution to the above problem, employing a novel rivet head configuration. The rivet 218 has a head 220 having an end face 221 and a forwardly tapered, frusto-conical section 222 located forwardly of the end face. As before, the rivet has a shank 219 with a protruding tail 219a. Other elements of the connection the same as those in FIG. 1 bear the same numerals, but with a "2" instead of "1" in the hundreds digit position.

The annular periphery 230 of the end face is substantially flush with the work surface 231; in addition, the end face forms a dome 232 protruding axially in a rearward direction, that dome being generally ring shaped and extending about axis 216. The extent of rearward protrusion of the dome is such that the entire end face 221 becomes substantially flush with the work surface, upon completion of rivet deformation, as indicated at 221a in FIG. 10, the dome there being substantially eliminated.

The dome, being ring-shaped, is closer to the countersink 214, whereby the rivet head material remains in engagement with the countersink and does not form a clearance therewith (as at 124 in FIG. 3) in response to dome flattening. For best results, the dome radially outer extent 232a, which flares outwardly and forwardly, is substantially entirely located in axially spaced relation to the countersink, i.e. the tapered counterbore 214. That flare, toward the head outermost periphery, is at an angle between 2° and 25° from a plane normal to axis 216. Further, the dome crest portion 232b is in substantial axial alignment with the shank outer surface 219b, and also work bore 213. The height "d" of the crest is between 0.002 and 0.016 inches, for best results.

Accordingly, all during the riveting process, the rivet head tapered surface 220c, throughout substantially its entire length, remains seated against the countersink (as contracted with the pull-away of the corresponding surface in FIG. 3, developing clearance), and no springback is produced to the extent that clearance would develop as at 124a in FIG. 5. In this regard, note that the central concavity at 233 of the head rear face in FIG. 7 becomes filled-in during rivet head deformation, i.e. ring-dome flattening. Deformation forces, indicated by the arrows in FIGS. 7 and 8 remain concentrated in alignment with the countersink 214, whereby the head metal is constantly forcibly urged toward that countersink to prevent development of clearances.

Typically, the rivet metal is softer than the work metal. For example, the rivet may have a tensile strength of at least about 14,000 psi and higher, and the work a tensile strength substantially in excess of the rivet tensile strength, for best results. The rivet and work may consist of like (or unlike) materials such as aluminum, aluminum alloy, Monel, titanium or titanium alloy, for example. Thus, the rivet and work will expand and contract at the same rate to prevent radial gaps during temperature change. In certain instances, the rivet may be harder than the work. If desired, the rivet shank and the workbore may both be forwardly tapered to like extent.

It will be noted in FIGS. 6-10 that deformation of the ring shaped dome is carried out without causing the hammer to impact the outermost periphery of the head, whereby said periphery accurately seats against the countersink.

Note also, in FIG. 10, the radial expansion of a narrow peripheral annular flat 260 on the rivet head, due to flattening of the ring shaped dome.

I claim:

1. In combination with a workpiece having a bore and a counterbore which is frusto-conical and tapers forwardly between a side of the workpiece and the bore, and toward the bore,
   (a) a rivet having an axially extending shank received in the workpiece and defining an axis,
   (b) the rivet including a head having an end face and a forwardly tapered frusto-conical section located forwardly of said end face,
   (c) the periphery of said head end face being substantially flush with the work surface, the end face forming a dome protruding axially in a rearward direction, said dome being generally ring-shaped and extending about said axis in substantially axial alignment with the outer surface of the shank, (d) the dome having an annular crest portion in axial alignment with said shank outer surface, and the dome radially outer extent which defines only about half of the dome being located in axially spaced relation to a forward taper defined by said forwardly tapered frusto-conical section, said dome crest portion being rearwardly convex in axial radial planes, (e) the head end face forming a concave central recess radially inwardly of said crest portion, the outermost annular extent of said recess located approximately in alignment with the outer surface of the shank.

2. The combination of claim 1 wherein the rivet and work are metallic, the rivet metal being softer than the work metal.

3. The combination of claim 1 wherein the rivet and work are metallic, the rivet metal being harder than the work.

4. The combination of claim 1 wherein the bottom of said recess is located radially inwardly of the periphery of said head.

5. The combination of claim 4 wherein the radially outermost annular surface of said dome flares forwardly toward the head periphery at an angle of between about 2° and 25° from a plane normal to said axis.

6. The combination of claim 1 wherein the rivet shank and workpiece bore are in interengagement and taper forwardly.

7. The combination of claim 1 including the workpiece which includes two parallel panels, the counterbore formed in one panel, and the rivet having an upset at the end of the shank opposite side head, said upset engaging the other panel.

8. The combination of claim 7 wherein the upset comprises a button at the outer side of the other panel.

9. The combination of claim 1 wherein the dome crest protrudes rearwardly between about 0.002 and 0.016 inches.

* * * * *